United States Patent [19]

Canet et al.

[11] Patent Number: 4,535,317

[45] Date of Patent: Aug. 13, 1985

[54] PIEZORESISTIVE GAUGE FORMED BY AN ELECTRICALLY CONDUCTIVE ORGANIC COMPOUND

[75] Inventors: Roland Canet, Lormont; Pierre Delhaes, Gradignan; Eliane Dupart, Cestas; Adolphe Pacault, Tolence; Claude Pascal, Cestas; Jean-Pierre Manceau, Préignac, all of France

[73] Assignee: Commissariat a l'Energie Atomique, France

[21] Appl. No.: 562,523

[22] Filed: Dec. 19, 1985

[30] Foreign Application Priority Data

Dec. 21, 1982 [FR] France .................. 82 21445

[51] Int. Cl.³ .................. H01C 10/10; G01L 1/18
[52] U.S. Cl. ..................... 338/36; 338/308; 338/4; 252/500
[58] Field of Search .................. 338/2–4, 338/36, 42, 308; 73/776, 721, 726, 727; 252/500

[56] References Cited

U.S. PATENT DOCUMENTS 4,026,905 5/1977 Cohen et al. .................. 252/500 X
4,349,606 9/1982 Kishimoto et al. .............. 338/308 X

FOREIGN PATENT DOCUMENTS 65419 11/1982 European Pat. Off. .

OTHER PUBLICATIONS

Bechgaard et al., "A New Organic Low Temperature Conductor: HMTSF-TNAP", Solid State Communications, vol. 25, No. 11, pp. 875–879, Mar. 1978.
Hermann, A. M., "Electrical Conductivity of Elastomeric TCNQ Complexes", *Electrical Properties of Polymers,* Technomics, pp. 120–138.
Ishiguro et al., "Elastic Properties of TTF-TCNQ", Journal Physical Society of Japan, vol. 42, No. 1, Jan. 1977.
Keryer et al., "The Most One-Dimensional CTC Belonging to the TTF-TCQN Series", Physics Stat: Solids (b), vol. 100, 1980, pp. 251–259.
Oct. 1978-Solid State Communications, vol. 28, No. 1, pp. 113–117, entitled "Elastoresistivity of TTF-TCNQ and Related Compounds", by S. Bouffard et al.

*Primary Examiner*—Roy N. Envall, Jr.
*Assistant Examiner*—C. N. Sears
*Attorney, Agent, or Firm*—Cesari and McKenna

[57] ABSTRACT

The present invention relates to a piezoresistive gauge. This gauge comprises a support, on which are formed two pairs of electrical contacts, partly covered with a piezoresistive element, made from an electricity-conducting organic compound, chosen from among the salts of tetramethyl-tetrathiofulvalene, quaternary ammonium salts of tetracyanoquinodimethane and diethyldimethyl-tetrathiofulvalene-tetracyanoquinodimethane (DEDMTTF-TCNQ).

This gauge can be used for measuring pressures of approximately 500 bars to a few kbars.

8 Claims, 3 Drawing Figures

PIEZORESISTIVE GAUGE FORMED BY AN ELECTRICALLY CONDUCTIVE ORGANIC COMPOUND

BACKGROUND OF THE INVENTION

The present invention relates to a piezoresistive gauge and its production process. More specifically, it relates to piezoresistive gauges, whose sensitive element is constituted by a conductive organic compound, said gauges being usable for measurement of pressures of approximately 500 bars to 10 kbars.

Piezoresistive gauges are known, which have a piezoresistive carbon element held between two copper conductors. However, these gauges suffer from the disadvantage of not having an adequate sensitivity for the measurement of pressures between 500 bars and a few kbars and in addition are influenced by the temperature.

SUMMARY OF THE INVENTION

The present invention specifically relates to a piezoresistive gauge obviating the aforementioned disadvantages.

The present invention therefore relates to a piezoresistive gauge comprising a piezoresistive element, wherein the piezoresistive element is constituted by an electricity-conducting organic compound chosen from the group including tetramethyl-tetrathiofulvalene salts, the quaternary ammonium salts of tetracyanoquinodimethane and diethyl-dimethyl-tetrathiofulvalene-tetracyanoquinodimethane (DEDMTTF-TCNQ).

Preferably, the piezoresistive element is constituted by a thin coating of said electricity-conducting organic compound, deposited on an insulating support, e.g. of quartz or glass. However, in certain cases, the piezoresistive element can be formed by a monocrystal of the electricity-conducting organic compound.

It is also possible to use a piezoresistive element constituted by a mixture of fine compacted powder of the electricity-conducting organic compound, placed on an insulating support.

The electricity-conducting organic compounds used in the invention are described in Annales de Physique, 1976, Vol. 1, No. 4-5, pp. 145-256 and in Journal de Chimie Physique, 1982, 79, No. 4.

Among the organic crystals, there is a special class of compounds in which the charge transfer phenomenon plays a vital part. These stable systems are formed by the association in solution of two molecules, whereof one A, acts as an electron acceptor, and the other D, acts as the electron donor. This reaction can be represented in the following way:

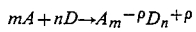

m and n representing the respective numbers of molecules and $\rho$ is the charge transfer relationship corresponding to the proportion of electrons transferred. If $m = n$, there is a simple stoichiometry and if m is $\neq$ of n, there is a complex stoichiometry. If $\rho$ is substantially equal to 0, the complex is a molecular complex with a neutral fundamental state.

If $\rho$ is equal to 1, it is a true ionic compound with one electric charge per molecule D or A, whilst if $\rho$ is lower than 1, there are less electric charges than there are molecules present. Thus, there is a mixed valency compound, which is the necessary requirement for obtaining an organic conductor. Thus, it is possible to make a distinction between:

(1) the true charge transfer complexes in which there is a transfer of an electron from the donor to the acceptor, said single electron then being located on the $\pi$ orbitals ($\pi - \pi$ complex); and (2) the radical ion salts in which only one of the ions is radical, the opposed ion being diamagnetic.

Their preparation can take place by direct oxidation reaction or a double exchange reaction from diamagnetic ionic salts.

According to the invention, the electricity-conducting organic compound is a tetramethyl-tetrathiofulvalene salt, such as tetramethyl-tetrathiofulvalene bromide or sulphocyanide, a tetracyanoquinodimethane quaternary ammonium salt such as tetracyanoquinodimethane-N-methylphenazinium (NMP-TCNQ) or diethyl-dimethyl-tetrathiofulvalene-tetracyanoquinodimethane.

Thus, according to the invention, the piezoresistive element is a charge transfer complex: diethyl-dimethyl-tetrathiofulvalene-tetracyanoquinodimethane (DEDMTTF-TCNQ) or a radical ion salt, or a radical anion of TCNQ (quaternary ammonium salts such as quinolinium, acridinium, phenazinium and bipyridillium salts), or a radical cation of TMTTF (salts of halides or pseudohalides $BF_4^-$, $ClO_4^-$, $SCN^-$, $NO_3^-$ ...).

It is pointed out that the tetracyanoquinodimethane is in accordance with the formula:

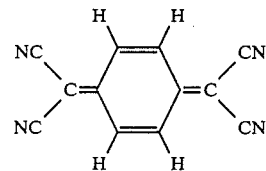

and that the tetramethyl-tetrathiofulvalene is in accordance with the formula:

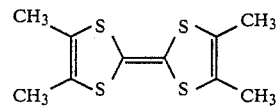

According to the invention, the piezoresistive element can be constituted by a charge transfer complex, such as diethyl-dimethyl-tetrathiofulvalene-tetracyanoquinodimethane (DEDMTTF-TCNQ), or by a radical ion salt, or by a radical anion of TCNQ (quaternary ammonium salts such as quinolinium, acridinium, phenazinium and bipyridillium salts), or a radical cation of TTF or TSF ($R_1R_2R_3R_4$), salts of halides or pseudohalides ($BF_4^-$, $ClO_4^-$, $SCN^-$, $NO_3^0$, ...).

Preferably, according to the invention, the organic compound constituting the piezoresistive element is tetrathiofulvalene-tetracyanoquinodimethane (TTF-TCNQ), tetramethyl-tetrathiofulvalene bromide ((TMTTF)$_2$Br), tetramethyl-tetrathiofulvalene sulphocyanide ((TMTTF)$_2$SCN), or N-methyl-phenazinium-tetracyanoquinodimethane (NMP-TCNQ).

According to the invention, the piezoresistive element of the gauge is preferably protected by an insulating plate, e.g. of mica, connected to the support by a sealing joint, which can be formed from an epoxy resin such as Araldite, or by some other polymer. The presence of this plate and this sealing joint makes it possible to protect the piezoresistive element against corrosion, thereby preventing damage thereto.

The invention also relates to a process for the preparation of a piezoresistive gauge having the aforementioned features. This process comprises the following stages:

(a) depositing an electricity-conducting material on certain parts of an insulating support, in order to form on the latter two pairs of electrical contacts, and (b) then depositing on the thus treated insulating support, a thin film of the electricity-conducting organic compound partly covering the thus deposited electrical contacts.

Advantageously, the organic compound film is deposited by vacuum evaporation. This deposition procedure can only be used in the cases of compounds for which it is possible to find deposition conditions corresponding to a sublimation, without thermal decomposition of the compound. In some applications, the organic compound may be deposited by active vapor phase transfer. In any event, generally this deposition takes place in such a way as to obtain 5000 to 8000 Å thick films, which corresponds to a resistance of a few kiloohms.

The insulating support is generally an amorphous support, constituted by a glass or quartz disk. However, it is also possible to use crystalline supports, e.g. of potassium bromide or mica and thus choose a crystalline structure of the support, which is close to that of the organic compound in order to obtain an epitaxial deposit. It is also possible to use flexible supports, e.g. made from polymer.

According to a process of the invention, an electricity-conducting material, constituted by a precious metal such as copper, silver, platinum, gold and alloys thereof, e.g. a gold-silver alloy, is deposited on certain parts of the insulating support, in order to form on the latter two pairs of electrical contacts constituting the input and output terminals of the gauge, which will be used on the one hand for supplying the gauge with electric current, and on the other for the connection of a measuring device, such as a voltmeter. This deposition process can be carried out by active vapour phase transfer or by vacuum evaporation using an appropriately shaped mask to obtain the desired geometry.

Thus, it is possible to use the same deposition enclosure for consecutively carrying out deposition by vacuum evaporation of the electricity-conducting organic compound film. In both cases, the evaporation temperature is chosen as a function of the material, the pressure, the temperature of the support, the distance between the support and the evaporation crucible and the nature of the support, so as to check the deposition rate and the quality of the thin films obtained.

When the electrical contacts and the thin organic compound films are deposited by vacuum evaporation, it is possible to use for successively performing these two operations, a sublimator comprising a glass bell placed above a vacuum system, whose primary and secondary pumps can reach a vacuum of approximately $10^{-6}$ torr.

According to the invention, it is also possible to obtain the piezoresistive gauge from a finely ground powder of an electricity-conducting organic compound.

In this case, use is preferably made of a flexible insulating support made e.g. from a polymer marketed under the trade mark Kapton. The finely ground powder is mixed with an insulating material powder, which will form an insulating matrix and this clearly takes place in appropriate proportions.

After placing the mixture on the support, the powder is compacted and in this way an approximately 1/10 mm thick and 10 mm long coating is formed, followed by the formation of the electrical connections.

A gauge of this type has the particular advantage of having a lower intrinsic resistance than that of gauges, whose piezoresistive element is a thin film. It can in particular be used as a strain gauge.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
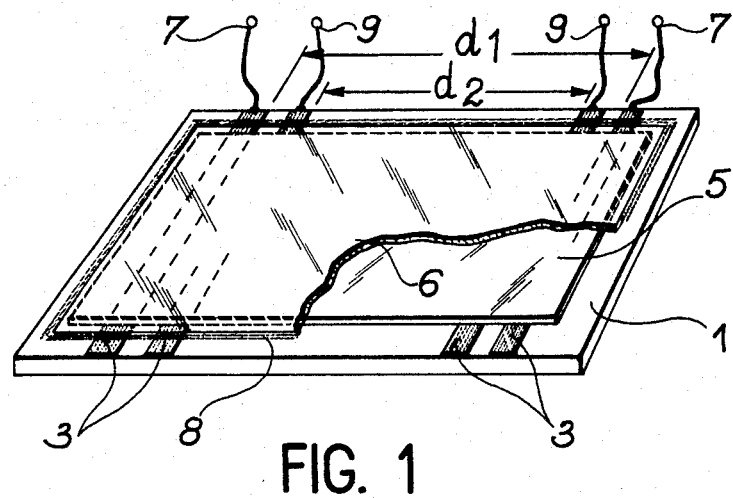
FIG. 1 diagrammatically and in perspective a piezoresistive gauge according to the invention.

FIG. 1 shows that the gauge comprises a glass insulating support 1, locally covered with two pairs of electrical contacts constituted by strips 3 of electricity-conducting material and a thin film 5 of an electricity-conducting organic compound, which also constitutes the piezoresistive element of the gauge. This thin film 5 only covers part of the strips 3 of conductive material, so as to be able to connect the gauge to an external circuit. Film 5 is protected against impacts and corrosion by a mica sheet 6, the necessary seal being obtained by a joint 8 made from an epoxy resin, such as Araldite.

This gauge can be produced in the following way. Four strips 3 of electricity-conducting material, e.g. gold or a gold-silver alloy are deposited, whilst using a mask, by vacuum evaporation on the glass insulating support 1. Support 1 with the strips 3 is then covered with the electricity-conducting organic compound film 5, once again by vacuum evaporation and using a mask in order to leave free the previously deposited ends of strips 3. Following this operation, electrical connections are formed on the ends of strips 3 by the microwelding of silver wires 7 and 9 and the thin film 5 is covered with a mica sheet 6, the sealing joint 8 then being produced by means of an epoxy resin, which is allowed to harden.

Thus, a piezoresistive gauge is obtained, whose first pair of contacts 3 spaced by distance $d_1$ can be connected to a stabilized power supply having an intensity of approximately 50 μA, whilst the second pair of contacts 3 spaced from one another by the distance $d_2$ can be connected by wires 9 to an electronic voltmeter for recording voltage variations at the gauge terminals.

The following examples illustrate the construction of three gauges according to the invention.

EXAMPLE 1

In this example, use is made of a piezoresistive element constituted by tetramethyl-tetrathiofulvalene bromide $(TMTTF)_2Br$.

The tetramethyl-tetrathiofulvalene molecule is firstly synthesized from corresponding thiones by a conventional process, such as that described in the article in Journal de Chimie Physique, 1982.

On a glass support of length 22 mm and width 10 mm, previously covered with four strips of gold and spaced in such a way that $d_1 = 10$ mm and $d_2 = 15$ mm, is deposited a thin film of the compound with a width of 3 mm and a length of 10 mm, under a pressure of $10^{-5}$ torr, at a temperature of 115° to 130° C., whilst maintaining the substrate at a temperature of 20° C., the latter being at a distance between 4 and 5 cm from the evaporation crucible containing the tetramethyl-tetrathiofulvalene bromide.

This gives a $(TMTTF)_2Br$ film of thickness 0.5 to 0.7 μm.

By using $(TMTTF)_2$-SCN in place of $(TMTTF)_2$-Br, under the same conditions, it is possible to obtain a similar $(TMTTF)_2$-SCN film.

The electrical connections 7 and 9 are then formed by microwelding the silver wires. The thin film is then covered with a 0.3 mm thick mica sheet and sealing is obtained by fitting an Araldite joint.

The properties of the thus obtained gauge are then checked by subjecting it to steady state pressure tests.

For the purpose of these tests, the piezoresistive gauge is subject to a hydrostatic pressure by placing it in an oil-filled enclosure, whose pressure has been varied by means of a hydraulic press. The resistance variations of the gauge are measured as a function of the pressure applied. For comparison, the same measurement is carried out in the same enclosure on a commercially available carbon gauge.

Figure 2:
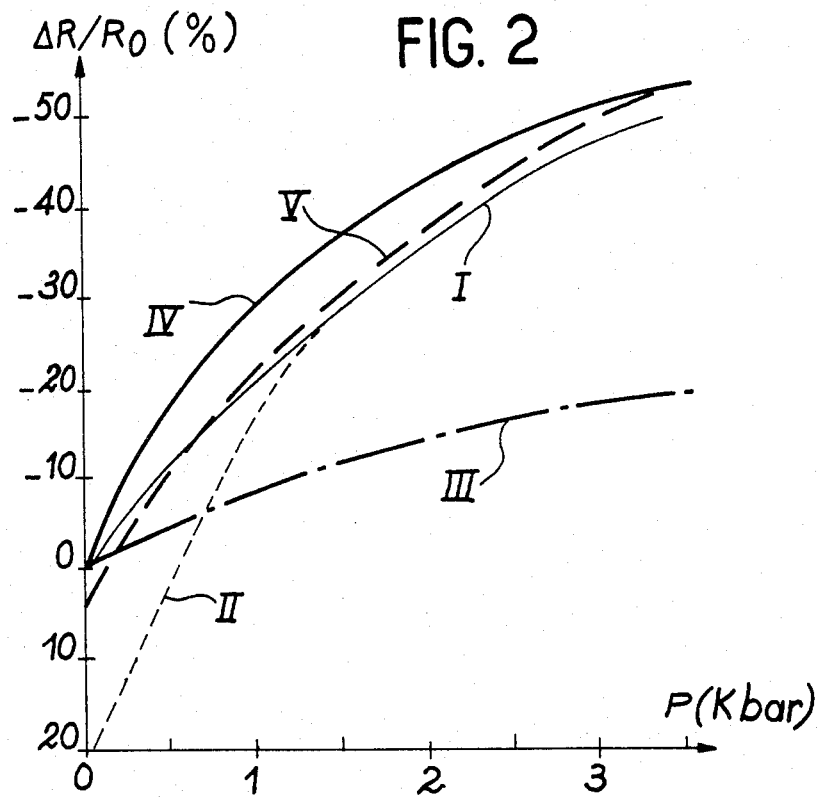
FIGS. 2 and 3 curves showing the resistance variations of gauges according to the invention, as a function of the pressure applied.

The results obtained are given in FIG. 2, in which curve I represents the variations of the resistance ($\Delta R/R_0$) (as a %) of the gauge as a function of the pressure applied (in kbar) during compression and the broken line curve II represents the variations ($\Delta R/R_0$), as a function of the pressure during decompression, $R_0$ representing the initial resistance of the gauge prior to the test.

It can be seen that the gauge has a slight hysteresis phenomenon, which is not prejudicial, because such gauges are not generally reused.

Curve III represents the results obtained with the commercial gauge. Thus, examination of the curves clearly shows that a better sensitivity is obtained with the gauge according to the invention.

EXAMPLE 2

A gauge identical to that of example 1 is produced, but in its production use is made of the piezoresistive element of N-methyl-phenazinium-tetracyanoquinodimethane (NMP-TCNQ). Firstly, the NMP-TCNQ molecule is synthesized from tetracyanoquinodimethane and N-methyl-phenazine by using a conventional redox reaction.

The thus obtained compound is then deposited on a support identical to that of example 1 by vacuum evaporation and under the following conditions:
pressure: $10^{-5}$ torr
deposition temperature: 20° C.
crucible temperature: 100° C.
distance between the support and the NMP-TCNQ crucible: 4–5 cm.

In this way, a 0.5 to 0.7 μm thick thin film is obtained. Then, as in example 1, the electrical connections are formed, followed by covering with a mica sheet and the formation of the Araldite joint. The properties of the thus obtained gauge are then checked by subjecting it to the same steady state pressure test.

The results obtained are given in FIG. 2, in which curve IV represents the variations of the resistance ($\Delta R/R_0$), as a function of the pressure applied during compression and curve V (in broken line form) represents the variation ($\Delta R/R_0$), as a function of the pressure during decompression.

As hereinbefore, there is a hysteresis effect, but the results obtained also confirm the superior sensitivity of the gauges according to the invention.

EXAMPLE 3

A gauge identical to that of example 1 is produced, but in its production use is made of a piezoresistive element of diethyl-dimethyl-tetrathiofulvalene-tetracyanoquinodimethane (DEDMTTF-TCNQ). Firstly, the DEDMTTF-TCNQ molecule is synthesized from tetracyanoquinodimethane and diethyl-dimethyl-tetrathiofulvalene using the conventional complexing reaction.

The thus obtained compound is then deposited on a support identical to that of example 1 using vacuum evaporation under the following conditions:
pressure: $10^{-5}$ torr
deposition temperature: 20° C.
crucible temperature: 80°–100° C.
distance between support and DEDMTTF-TCNQ crucible: 4 to 20 cm.

Figure 3:
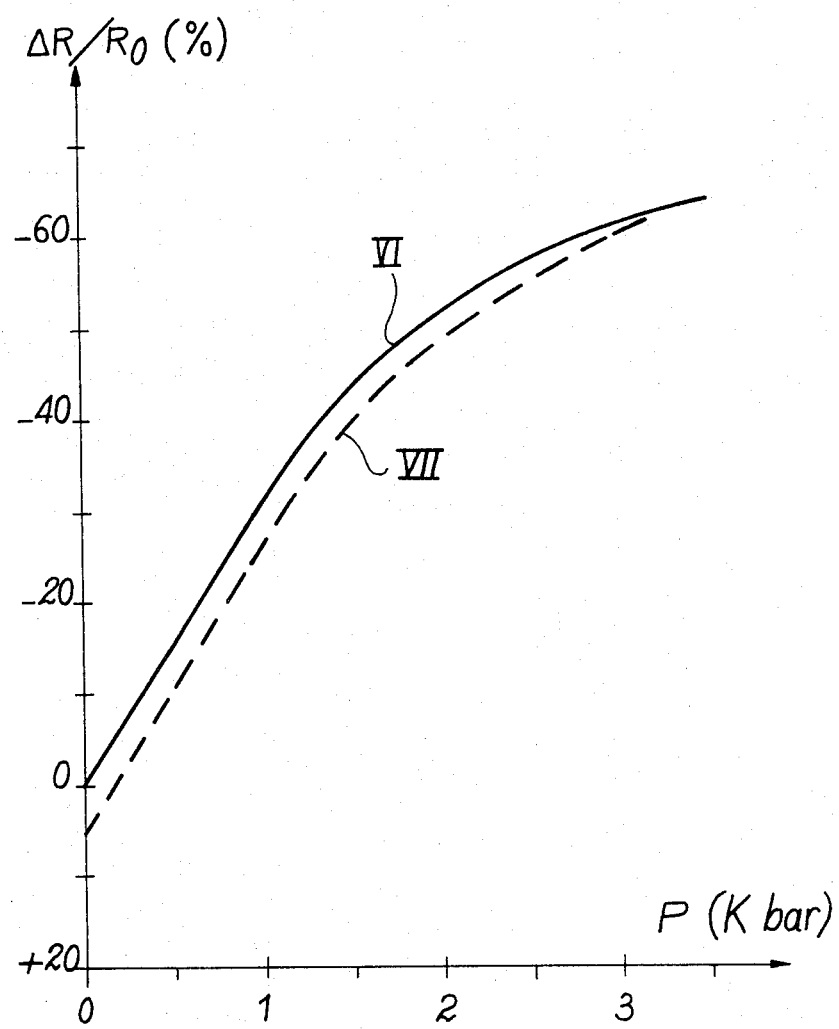

Thus, a 0.5 to 0.7 μm thick film is obtained followed, as in example 1, by the electrical connections. The film is then covered with a mica sheet and the Araldite joint is formed. The properties of the thus obtained gauge are checked by subjecting it to the same steady state pressure test. The results obtained are given in FIG. 3, in which curve VI represents the variations of the resistance ($\Delta R/R_0$) (%), as a function of the pressure applied during compression and curve VII (in broken line form) represents the variations ($\Delta R/R_0$) during decompression.

The results obtained confirm the superior sensitivity of the gauge according to the invention. Moreover, the hysteresis effect is much less than with the compounds used in examples 1 and 2.

What is claimed is:

1. A piezoresistive gauge that is particularly sensitive to pressure between 500 bars and a few kilobars comprising a piezoresistive element constituted by an electricity-conducting organic compound chosen from the group consisting of tetramethyl-tetrathiofulvalene salts, the quaternary ammonium salts of tetracyanoquinodimethane and diethyl-dimethyl-tetrathiofulvalene-tetracyanoquinodimethane (DEDMTFF-TCNQ).

2. A piezoresistive gauge according to claim 1, wherein the piezoresistive element is constituted by a film of an electricity-conducting organic compound, deposited on an insulating support.

3. A piezoresistive gauge according to claim 1, wherein the piezoresistive element is constituted by a mixture of compacted fine powder of the electricity-conducting organic compound placed on an insulating support.

4. A piezoresistive gauge according to claim 2, wherein the insulating support is made from quartz or glass.

5. A piezoresistive gauge according to claim 1, wherein the tetramethyl-tetrathiofulvalene salt is tetramethyl-tetrathiofulvalene bromide or sulphocyanide.

6. A piezoresistive gauge according to claim 1, wherein the quaternary ammonium salt of tetracyanoquinodimethane is N-methyl-phenazinium-tetracyanoquinodimethane (NMP-TCNQ).

7. A piezoresistive gauge according to claim 1, wherein the piezoresistive element is protected by an insulating plate connected to the support by a sealing joint.

8. A piezoresistive gauge according to claim 7, wherein the sealing joint is an epoxy resin.

* * * * *

UNITED STATES PATENT AND TRADEMARK OFFICE
CERTIFICATE OF CORRECTION

PATENT NO. : 4,535,317
DATED : August 13, 1985
INVENTOR(S) : Canet et al.

It is certified that error appears in the above—identified patent and that said Letters Patent are hereby corrected as shown below:

On the title page:
Filing date listed incorrectly.

Change "12/19/85" to --12/19/83--.

Signed and Sealed this

Twelfth Day of August 1986

[SEAL]

Attest:

DONALD J. QUIGG

Attesting Officer

Commissioner of Patents and Trademarks